Dec. 10, 1935.  G. L. SMITH  2,023,706
BUTTER AND CHEESE CUTTER
Filed June 18, 1934
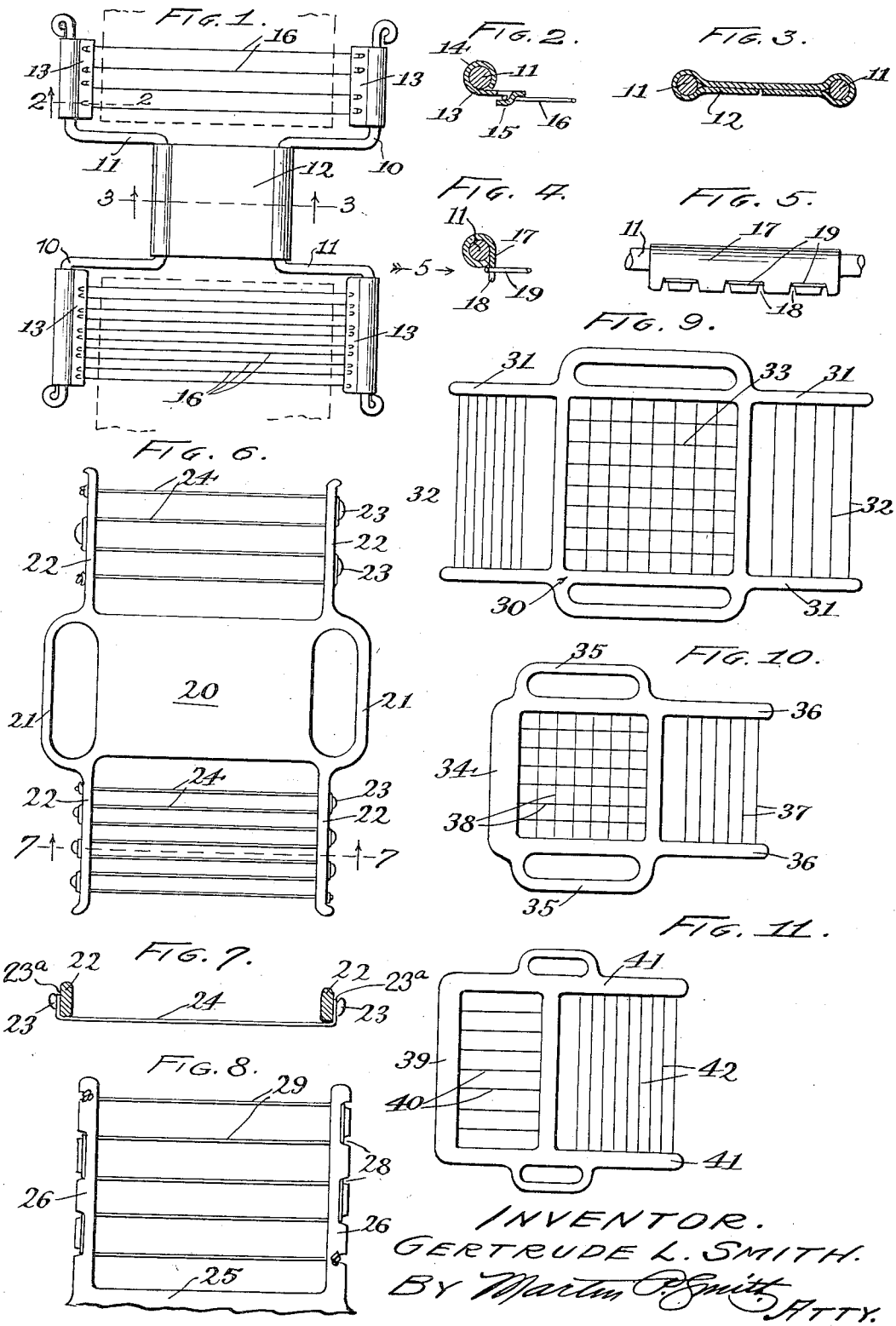

Patented Dec. 10, 1935

2,023,706

UNITED STATES PATENT OFFICE 2,023,706

BUTTER AND CHEESE CUTTER

Gertrude L. Smith, Los Angeles, Calif.

Application June 18, 1934, Serial No. 731,110

4 Claims. (Cl. 31—27)

My invention relates generally to culinary utensils and more particularly to a cutter that may be conveniently employed for cutting or slicing food products such as butter, cheese, hard-boiled eggs, vegetables and the like.

A further object of my invention is, to provide a cutting or slicing device of the character referred to that is of strong and rigid construction, capable of being readily manipulated and said device having two or more sets of relatively small or fine cutting wires arranged in parallelism and mounted so as to cut various products into slices or sections of uniform size.

A further object of my invention is, to generally improve upon and simplify the construction of the existing forms of devices designed for the cutting or slicing of butter, cheese and eggs and for the slicing or dicing of vegetables or fruit.

With the foregoing and other objects in view my invention consists in certain novel features of construction and arrangements of parts that will be hereinafter more fully described and claimed and illustrated in the accompanying drawing in which:

Fig. 1 is a plan view of a cutter constructed in accordance with my invention.

Fig. 2 is a cross section taken on the line 2—2 of Fig. 1.

Fig. 3 is a cross section taken on the line 3—3 of Fig. 1.

Fig. 4 is a sectional view similar to Fig. 2 and showing a modified arrangement for anchoring the cutting wires.

Fig. 5 is an elevational view taken looking in the direction indicated by the arrow 5 in Fig. 4.

Fig. 6 is a plan view of a modified form of the cutter.

Fig. 7 is a cross section taken on the line 7—7 of Fig. 6.

Fig. 8 is a plan view of the end portion of a further modified form of the device.

Fig. 9 is a plan view of the device constructed in accordance with my invention for performing, slicing and dicing operations.

Fig. 10 is a plan view of a modified form of the slicer and dicer.

Fig. 11 is a plan view of a further modified form of the slicer.

Referring by numerals to the accompanying drawing and particularly to Figures 1 to 3 inclusive, which illustrate a preferred embodiment of my invention, 10, 10 designate a pair of identical side members preferably formed of heavy wire and the intermediate portion of each member is bent inwardly to form a substantially C-shaped member 11, thus spacing the end portions of the side members further apart than the intermediate portions.

The parallel central portions of the members 11 are rigidly connected in any suitable manner, preferably by a plate or strip 12 of sheet metal which passes around the parallel legs of the members 11. Connecting member 12 which provides a convenient handle for the manipulation of the device, is rigidly secured to the parallel legs of the members 11, either by spot welding, brazing or rivets.

Rigidly fixed on the spaced end portions of the side members 10, and extending lengthwise thereon are metal straps 13 having portions 14 that are wrapped about the members 10 and portions of these straps project toward each other inwardly from the portions of members 10 upon which they are mounted.

Pressed downwardly from the projecting portions of the straps 13, are short fingers or tongues 15, which latter are spaced equal distances apart and the tongues on one strap are positioned in direct transverse alignment with the tongues on the other strap.

These tongues or fingers 15 provide anchorage for the cutting wires 16, which latter are formed by extending a wire of suitable length from one side of the device to the other and passing said wire between the fingers 15 and the under faces of the straps 13.

The ends of the wire, after being thus arranged between the two sides of the device, are suitably secured to the straps 13.

Thus the cutting wires are arranged in parallelism between the widened end portions of the frame of the device, and due to the uniform spacing of the fingers 15, the wires are arranged equal distances apart and therefore when the device is used the wires will cut the food product into slices of uniform thickness.

I prefer to space the wires at one end of the frame further apart than the spacing of the wires at the other end of the frame, thus enabling the device to be used for cutting slices of different thicknesses.

In the modified construction illustrated in Figs. 4 and 5, straps of metal such as 17, are wrapped around the spaced end portions of the side members of the frame with portions of said straps extending vertically downward. Formed in these depending portions of the straps are slits or notches 18 that provide anchorage for the cutting wires such as 19 that extend from one side of the device to the other.

The modified construction illustrated in Fig. 6 comprises a plate 20 of pressed sheet metal or cast metal and formed on the ends of said plate are handles 21 that facilitate the manipulation of the device.

Projecting in opposite directions from the sides of plate 20, are spaced parallel arms 22, on the outer faces of which are formed ears or lugs 23, the latter being provided at their upper ends with notches or recesses 23ᵃ. A fine wire or wires are extended between the arms 22 to form a plurality of cutting members 24 that are spaced apart from and arranged parallel with each other and portions of these wires occupy the notches in the ears or lugs 23.

The ends of the wire or wires forming the cutting members 24 are suitably anchored to the arms 22.

As illustrated in Fig. 6, I prefer to space the wires between one set of arms further apart than the wires between the other pair of arms, thus enabling the device to be used for cutting butter, cheese and the like into slices of different thicknesses.

In the modified construction illustrated in Fig. 8, the body 25 of the device may be cast or pressed from suitable sheet metal and projecting from one side or end thereof are parallel arms 26. Formed in the outer edges of these arms are notches 28 for the reception of the wire or wires 29 that are drawn taut between the arms 26 to form cutting and slicing elements.

In the modified construction illustrated in Fig. 9, a rectangular frame 30 is formed of cast metal or pressed sheet metal and projecting from opposite sides of this frame are parallel arms 31.

Cutting wires 32 disposed in parallel spaced relation are arranged between the pairs of arms 31 and anchored thereto in any suitable manner to form cutting elements, and arranged within the frame 30 are two sets of spaced parallel wires or cutting elements 33, the wires or elements of one set being disposed at right angles to the wires or elements of the other set so that said wires cross each other.

The central portion of this device containing the crossed wires or cutting elements may be conveniently used for cutting fruit, vegetables and the like, into small cube-like portions and such device in the culinary art is referred to as a dicer.

In the modified construction illustrated in Fig. 10, a substantially rectangular frame 34 is formed of cast or pressed sheet metal and provided on opposite sides with handles 35. Projecting from one end of this frame, are parallel arms 36 between which are arranged taut wires 37 that may be used in performing slicing operations, and arranged within the frame 34 and connected to the rails thereof are two sets of crossed wires 38 which perform dicing operations when the implement is so used.

In the modified form of device illustrated in Fig. 11, a substantially rectangular frame 39 is formed of cast or pressed metal and extending from one side rail of said frame to the other are spaced parallel wires or cutting elments 40.

Projecting from the corners of frame 39 on one side thereof, are spaced arms 41, and extending between these arms are spaced parallel wires or cutting elements 42.

In retail trade butter is to a large extent produced and packed in quarter-pound portions, which are about three or four inches in length and likewise cheese is produced for the retail trade in small rectangular portions and my improved cutter is proportioned so that these blocks of butter or cheese may be at one operation cut into slices of uniform thickness.

By constructing the device with a frame having spaced end portions and extending the cutting wires across these spaced ends, the device may be used for cutting from the end of a block or portion of cheese or butter any number of slices desired, and in Fig. 1 I have shown in dotted lines portions of cheese or butter arranged so that a number of slices of uniform thickness may be cut from the ends of said portions of cheese or butter.

Thus the device may be used for simultaneously cutting a portion of food product into slices of uniform thickness or for cutting one or more slices from the end of the portion of food product.

In the manipulation of my improved cutting and slicing device, the frame thereof is manually engaged and manipulated so as to position the wires on top of the butter, cheese, egg or vegetable that is to be sliced and sufficient downward pressure is exerted upon the device to force the cutting wires through the product, and as a result the latter, or a portion thereof, is cut into slices of uniform thickness.

Thus it will be seen that I have provided a cutting and slicing device that is relatively simple in construction, inexpensive of manufacture and very effective in performing the functions for which it is intended.

It will be understood that minor changes in the size, form and construction of the various parts of my improved butter and cheese cutter may be made and substituted for those herein shown and described without departing from the spirit of my invention, the scope of which is set forth in the appended claims.

I claim as my invention:

1. A cutter for butter, cheese, eggs, vegetables and the like, comprising a frame, a pair of parallel arms projecting from one side of said frame, a plurality of spaced parallel wires arranged between said arms and two sets of spaced parallel wires arranged within said frame with the wires of one set disposed substantially at right angles to the wires of the other set.

2. A cutter for butter, cheese, eggs, vegetables and the like, comprising a frame, two sets of parallel spaced wires arranged within said frame with the wires of one set disposed substantially at right angles to the wires of the other set, a pair of parallel arms extending from each end of said frame and a plurality of spaced parallel wires extending between the members of each pair of arms.

3. A cutter for butter, cheese, eggs, vegetables and the like, comprising a handle, spaced parallel arms projecting from both ends of said handle and spaced parallel cutting members arranged between each pair of spaced arms.

4. A cutter for butter, cheese, eggs, vegetables and the like, comprising a frame, a pair of parallel arms projecting from one end of said frame, a plurality of spaced parallel cutting members arranged between said arms and two sets of spaced parallel cutting members arranged within said frame with the cutting members of one set disposed substantially at right angles to the cutting members of the other set.

GERTRUDE L. SMITH.